Figure 1:
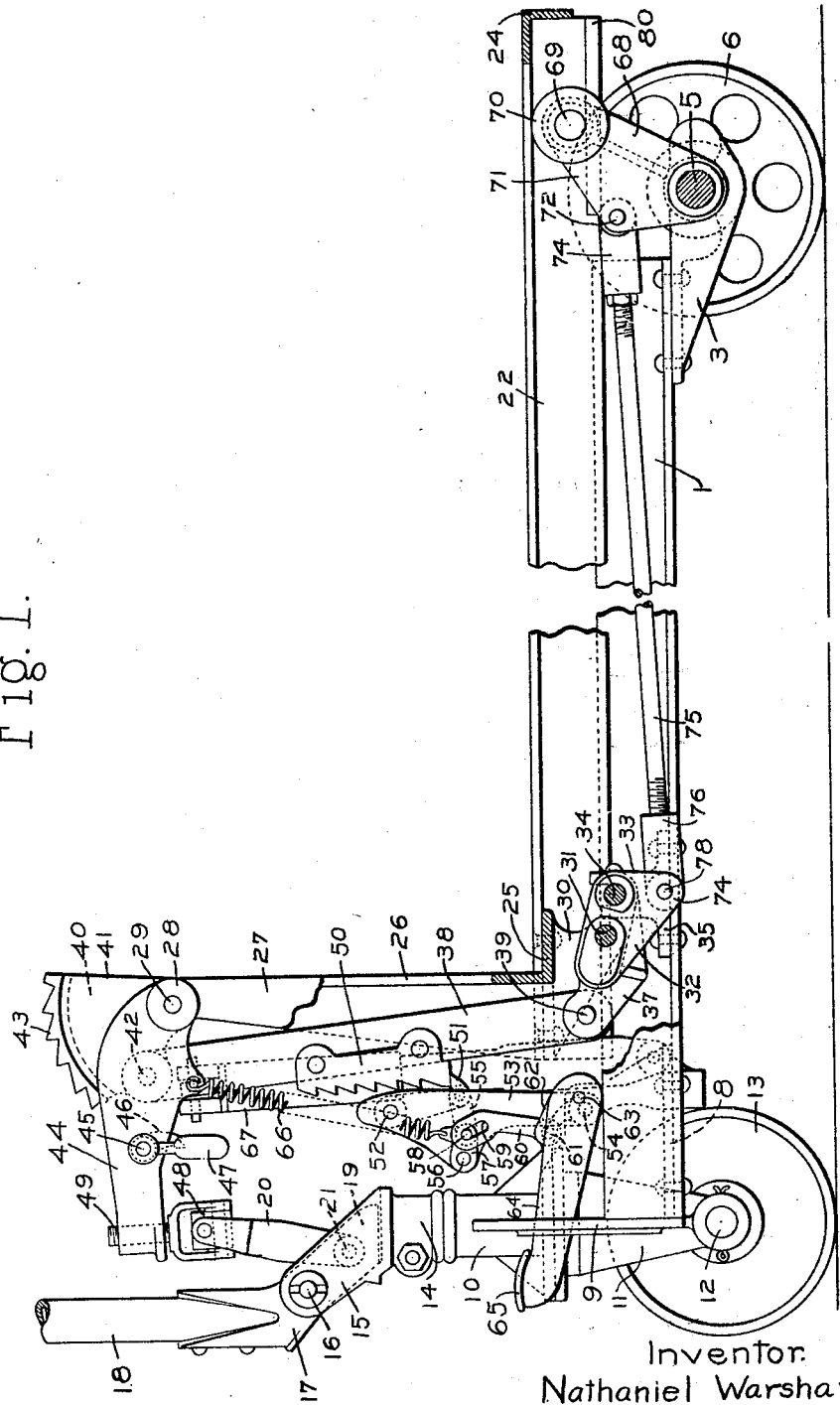

Dec. 22, 1931. N. WARSHAW 1,837,600
ELEVATING TRUCK
Filed May 13, 1930 2 Sheets-Sheet 1

Inventor.
Nathaniel Warshaw
by Heard Smith Trimmel
Attys.

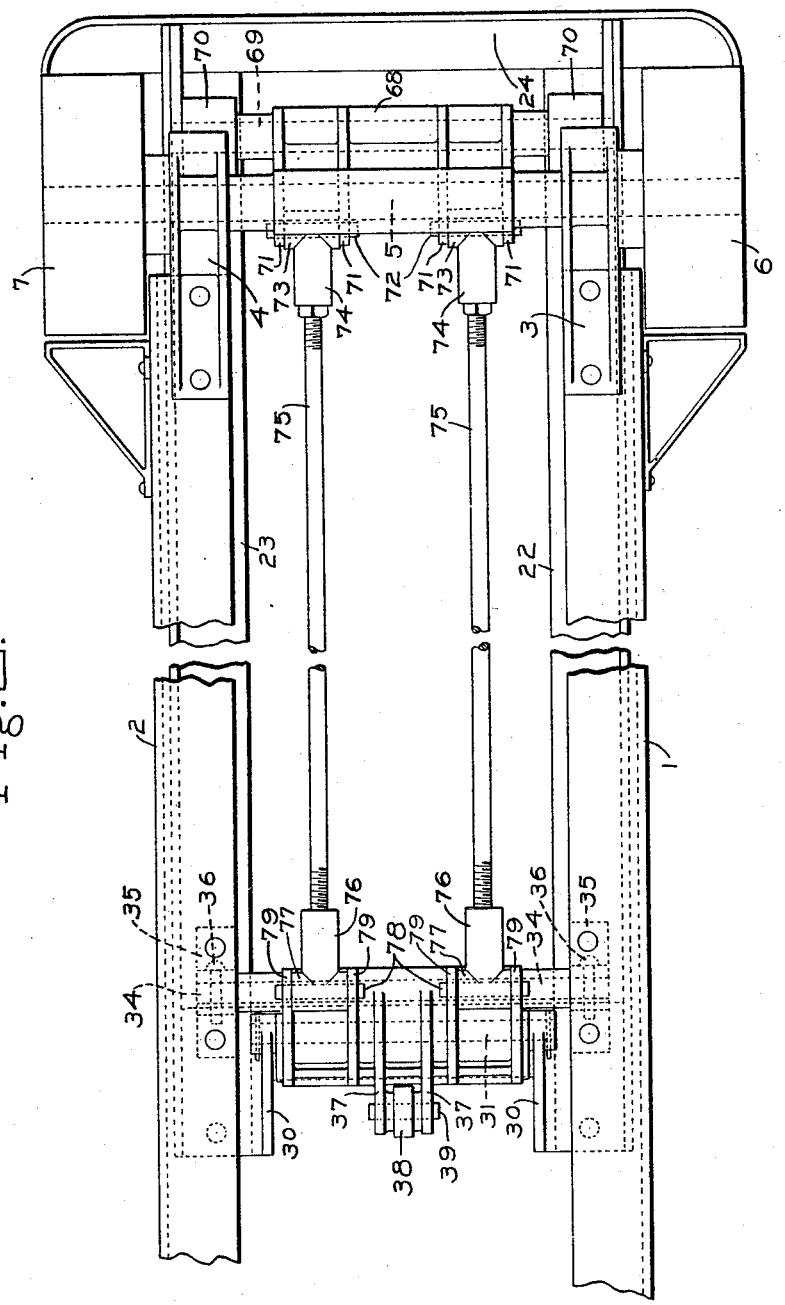

Patented Dec. 22, 1931

1,837,600

UNITED STATES PATENT OFFICE

NATHANIEL WARSHAW, OF MATTAPAN, MASSACHUSETTS, ASSIGNOR TO LEWIS-SHEPARD COMPANY, OF WATERTOWN, MASSACHUSETTS, A CORPORATION OF MASSACHUSETTS

ELEVATING TRUCK

Application filed May 13, 1930. Serial No. 451,917.

This invention relates to improvements in elevating trucks in which mechanism is provided for raising the load supporting means relatively to the floor step by step by vertical swinging movements of the tongue, and one of the objects of the invention is to provide an elevating truck capable of lifting and transporting heavy loads, with lifting means for the rear end of the truck which will be of a more stable construction than in trucks heretofore provided and which will prevent rocking of the load supporting means when in elevated position.

A further object of the invention is to provide means for lifting the rear end of the load supporting means pivotally mounted upon the rear axle and which, when in elevated position, lies in such proximity to the vertical plane of the rear axle as to relieve in a great measure the strain upon the locking mechanism which retains the load supporting means in elevated position.

Another and very important object of the invention is to provide an elevating truck in which the front end of the load supporting means is raised by the vertical swinging movement of the tongue through pawl and ratchet mechanism, with means connecting the tongue with the lever for actuating the pawl and ratchet mechanism capable of such adjustment as to take up wear, and also to facilitate the construction and assembling of the elevating mechanism.

These and other objects and features of the invention will more fully appear from the following description and the accompanying drawings and will be particularly pointed out in the claims.

The invention is disclosed herein as embodied in a lifting truck of the type disclosed in Patent No. 1,445,838 granted February 20, 1923, to Lewis-Shepard Company assignee of Ralph M. Lovejoy.

In the drawings:

Fig. 1 is a side elevation of an elevating truck embodying the present invention; and, Fig. 2 is an underneath plan view of a portion of the same, illustrating particularly the front and rear lifting means and the means for adjustably connecting the same, the front end of the truck including the steering wheel and lifting mechanism being omitted.

The elevating truck illustrated in the accompanying drawings comprises a main frame having side bars 1 and 2, preferably structural steel angle bars, having bolted, riveted, welded, or otherwise secured to their rear ends brackets 3 and 4 providing journals for a rear axle 5, the wheels 6 and 7 of which are rotatably mounted thereupon, ball bearings (not shown) preferably being interposed between the hubs of the wheels and the rear axle 5. The front ends of the side bars 1 are riveted, welded, or otherwise connected to a horizontal plate 8 of a head 9 which extends transversely of said side bars and which is provided with a central hollow boss 10 forming a journal for a vertical steering post. The steering post, which is journalled in the boss 10, is provided with a downwardly extending yoke 11 having at its lower end bosses which receive an axle 12 upon which the front steering wheel or wheels 13 are mounted. A split collar 14, which is secured to the upper end of the steering post, is provided with a pair of upwardly and forwardly extending ears 15 in the upper end of which a shaft 16 is mounted upon which a metallic base 17 of the steering tongue 18 is pivotally mounted. The base 17 of the steering tongue is provided with a bifurcated or channeled extension 19 which, when the tongue is in vertical position, preferably lies between the ears 15 and 16 and to which a strut 20 is detachably connected by a pin 21.

The load supporting means comprises a skeleton platform having side bars 22 and 23, desirably formed of angle iron, with their horizontal flanges uppermost and with their vertical flanges disposed within the vertical flanges of the side members 1 and 2 and in proximity thereto and with the horizontal flanges uppermost. The rear ends of the side bars 22 and 23 of the platform are connected by a transverse girder 24, preferably of angle iron, and which is welded, or otherwise secured to the side bars 22 and 23 of the load supporting means and which preferably extends to the outer planes of the wheels 6 and 7, the end portions of said transverse girder being rounded. The girder, therefore, not only serves to protect the rear wheels from injury as the truck is backed, but also avoids sharp corners which might otherwise damage articles against which the end of the rear girder might come in contact.

The front ends of the side bars 22 and 23 of the load supporting means are riveted, welded, or otherwise connected to a transverse girder construction 25 having upwardly extending standards 26 and 27 which are connected together near their upper ends and are provided with bosses 28 in which a transverse pivotal shaft 29 is mounted.

The transverse girder construction is provided with preferably integral downwardly extending ears 30 in which a transverse shaft 31 is mounted which passes through webs 32 of a front lifting beam 33. The webs 32 of the lifting beam 33 are provided with journals which receive a transverse shaft 34, the ends of which are seated in vertical open bearings in brackets 35 which rest upon and are welded to the horizontal flanges of the side bars 1 and 2. The shaft 34 is rigidly secured in bearings in the brackets 35 by pins 36 which extend through the bearings of the shaft.

The lifting beam is provided with integral forwardly extending arms 37 which are spaced apart to receive the lower end of a lifting link 38 which is pivotally connected to said arms by a pin 39. The upper end of the lifting link 38 extends into a recess 40 between the webs of a sector 41 which is pivotally connected upon the shaft 29, the upper end of the link being pivotally connected to the webs of said sector by a pin 42. The sector 41 is provided with a series of teeth 43. A lifting lever 44, having a bifurcated rear end portion embracing the sector 41, is pivotally mounted upon the shaft 29 and is provided with a transverse shaft 45 having rigidly fixed thereupon a pawl 46 adapted to engage the teeth 43 of the sector.

The shaft 45 has a counterweighted handle 47 adapted when the pawl 46 is rotated into engagement with the sector to hold the pawl in engagement with the sector and when the sector is raised to a sufficient height and locked therein to cause the pawl to drop out of engagement with the sector as illustrated in Fig. 1.

The strut 20, which is pivotally connected to the tongue extension 19, extends upwardly in substantial alinement with the vertical axis of the steering post and is connected at its upper end to a gimbal joint 48 which is adjustably connected to the lifting lever 44 by suitable means such as a screw threaded stem 49 engaging the screw threaded wall of an aperture through the forward end of the lifting lever for purposes which will hereinafter be more fully described.

It will be obvious from the prior well known constructions, such as is disclosed in the patent above mentioned, that when the pawl 46 is placed in engagement with the teeth 43 of the ratchet, the vertical downward swinging movement of the tongue will rotate the sector 41 about the shaft 29, thereby raising the lifting link 38 step by step, suitable means, of course, being employed to lock the load supporting means against descent at each step of elevation until the sector has been raised to such position that an upward movement of the tongue will by permitting a downward movement of the lifting lever 44 enable the dog 46 to drop out of engagement with the lowest tooth of the sector, as more fully described in the patent above mentioned.

The mechanism for locking the load supporting means at each step of elevation illustrated herein may be and desirably is of the same construction as that disclosed in the patent above mentioned.

The locking mechanism shown comprises a toothed rack 50 which is rigidly secured to the lifting link 38 and is adapted to be engaged by a depending dog 51 which is pivotally mounted upon a pin 52 mounted in the upper end of parallel links 53, the lower ends of which are pivotally mounted upon a shaft 54 journalled in suitable bosses in the head of the main frame. The locking dog 51 is held in operative position by toggle links 55, one of which is pivotally connected to the lower end of the dog 51, and the other of which is rigidly connected to a shaft 56 which is mounted in the links 53 and is provided with an arm 57 having a laterally extending pin or crank 58 which is slidably mounted in a slot 59 in the link 60, the lower end of which is pivotally mounted upon a pin 61 extending laterally from the arm 62 of a bell crank lever which is pivotally mounted upon a stud 63 and is provided with an arm 64 extending through a slot in the vertical web of the head 9 and provided with a pedal 65.

The pedal 65 is normally held in raised position and the dog in engagement with the teeth of the ratchet by a spiral spring 66, the lower end of which is secured to a boss on the arm 57 of the shaft 56, and at its upper end to a stud extending laterally from the lifting lever 44. A suitable dash pot 67, which is interposed between the lifting lever 44 and the base frame, serves to check the descent of the platform after the locking dog is released by the depression of the foot pedal 65.

The lifting and releasing mechanism above described is substantially the same as that disclosed in the prior patent except for the adjustable connection between the vertical strut 30 and the lifting lever 44.

It is found that in practical use of constructions of this type, the high vertical standard is sometimes bent rearwardly by the strains which are imposed upon it by the lifting mechanism, or that the standard is swung rearwardly by the sagging of the central portion of the platform when subjected repeatedly to heavy loads, so that the pivotal shaft 29, upon which the sector 41 and lifting lever 44 are mounted, is moved rearwardly and downwardly. Inasmuch as the length of the link 38 remains constant, the sector 41 is rocked upwardly and rearwardly, thus improperly increasing the clearance between the pawl 46 and the teeth 43 of the sector, thereby producing undesirable lost motion between the pawl and the sector.

The lost motion between the pawl and the sector if sufficiently great so decreases the distance through which the link 38 is lifted, by engagement of the pawl 46 with the teeth 43 of the sector, that the rack 50 will not register properly with the pawl 51 of the locking mechanism and may render the locking mechanism ineffective.

By providing an adjustable connection between the strut 20 and the forward end of the lifting lever 44, such variation may be compensated and such adjustment can be accomplished by removing the pin 21 at the lower end of the strut 20 and then rotating the strut in a proper direction to raise or lower the lever in such a manner as to compensate for variations of the clearance between the pawl and the teeth of the sector. Furthermore, by providing this adjustment compensation may be made for wear to any of the bearings of the lifting mechanism which would effect proper engagement between the pawl and sector. An additional great advantage is secured in that accuracy of manufacturing and assembling of the parts, which has heretofore been required, is avoided by reason of this adjustment, so that the lifting links may be jigged and bored during their manufacture without the necessity of accurately measuring the distance between the centers of the pivot 29 of the lever and the pivot 45 of the dog and the boring of the holes for one or both of these pivots by hand.

Other important objects of the invention, as above stated, are to provide a rigid rear-end lifting construction which will provide greater stability against rocking of the load supporting means, and which when in elevated position will lie in proximity to the vertical plane of the rear axle and thereby relieve, in a great measure, the strain imposed upon the locking mechanism.

In the preferred construction illustrated a rear-end lifting beam 68 is pivotally mounted upon the rear axle 5 and is provided at its upper end with a shaft 69, the ends of which preferably underlie the side bars 22 and 23 of the load supporting means, and are preferably provided with anti-friction rollers 70 which engage the under faces of the horizontal flanges of the side bars 22 and 23. The lifting beam 68 desirably is provided with pairs of webs 71 which extend in a direction longitudinally of the truck and are spaced apart and are pivotally connected by pins 72 to sleeves 73 having forwardly extending integral bosses 74 which are axially bored and the internal walls thereof screw threaded to receive the screw threaded ends of links 75. The links 75 are connected at their opposite or front ends in a similar manner to bosses 76 extending rearwardly from sleeves 77 which are pivoted upon pins 78 mounted in pairs of webs 79 extending downwardly from the front lifting beam 33, thereby forming a bell crank construction.

The connecting rods 75 are provided at opposite ends with right and left hand screw threads so that by rotating the rods the position of the rear lifting beam may be adjusted in such manner as to provide proper horizontal parallel relation between the load supporting means and the main frame.

In the operation of the device, the actuation of the lifting mechanism by vertical swinging movements of the tongue, as above described, causes rotation of the front lifting beam, which is in effect a bell crank lever, in a direction to draw the links 75 forward and thereby swing the rear lifting beam forwardly about the axis of the rear axle. By reason of the fact that the upper ends of the rear lifting beam engage the under face of the flanges of the side bars 22 and 23 of the load supporting means, and are movable relatively thereto, upon their anti-friction rollers or by sliding engagement therewith as the case may be, the rear lifting beam may be moved through a suitable arc during the lifting operation to a position approximating the vertical, thereby causing a minimum strain to be imposed upon the locking mechanism while the load supporting means is in elevated position. This is very important as trucks of this character are designed for heavy loads weighing from eight thousand to twenty-five thousand pounds.

It is obvious also that by thus supporting the side bars of the load supporting means directly upon the ends of a heavy and rigid rear-lifting beam, a maximum stability against twisting strains, caused by unequal distribution of the load upon the truck and against racking strains caused by the rocking of the load, is attained.

Desirably the rear end portions of the vertical flanges of the side bars 22 and 23 of the load supporting means are provided with tracks 80 which extend in parallelism with the vertical horizontal flanges of said side bars and are located beneath and in co-operative relation to the ends of the shaft 69 and act to prevent separation of the load supporting means from the rear lifting means. These tracks may be engaged by the end of the load supporting means upon downward swinging movement of the rear lifting means, thus insuring proper depression of the load supporting means. They also enable the operator to lift the rear end of the truck without separating the load supporting means from the frame of the truck when it is found convenient so to manipulate the rear end of the truck as to position it properly for rearward movement beneath such platforms as are transported with the load imposed thereupon in usual use of elevating trucks.

It will be obvious that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. An elevating truck comprising a wheel-supported main frame, load-supporting means, a rear lifting beam pivotally mounted on said frame having means engaging said load-supporting means movable longitudinally thereof and relatively thereto, means for lifting the front end of said load-supporting means substantially vertically, and means operable thereby to swing said rear lifting beam toward vertical position, thereby raising the rear end of said load-supporting means substantially vertically.

2. An elevating truck comprising a wheel-supported main frame, load-supporting means, a rear lifting beam pivotally mounted on said frame having anti-friction rollers engaging said load-supporting means movable longitudinally thereof and relatively thereto, means for lifting the front end of said load-supporting means substantially vertically, and means operable thereby to swing said rear lifting beam toward vertical position, thereby raising the rear end of said load-supporting means substantially vertically.

3. An elevating truck comprising a wheel-supported main frame, load-supporting means, a rear lifting beam pivotally mounted on said frame having at its upper end anti-friction rollers engaging said load-supporting means movable longitudinally thereof and relatively thereto, means for lifting the front end of said load-supporting means substantially vertically, and means operable thereby to swing said rear lifting beam toward vertical position, thereby raising the rear end of said load-supporting means substantially vertically, and tracks on said load-supporting means located beneath and in co-operative relation to the anti-friction rollers of the rear lifting beam.

4. An elevating truck comprising a wheel-supported main frame, load-supporting means, a front lifting beam pivotally mounted on said main frame and pivotally connected to said load-supporting means, a rear lifting beam pivotally mounted on said frame having means engaging said load-supporting means movable longitudinally thereof and relatively thereto, means for actuating said front lifting beam to raise the front end of said load-supporting means substantially vertically, a link connecting said front lifting beam to said rear lifting beam operable upon actuation of said front lifting beam to swing said rear lifting beam toward vertical position, thereby simultaneously lifting the rear end of said load-supporting means substantially vertically, and means for adjusting the effective length of said link, whereby the height to which the rear end of said load-supporting means is raised may be varied.

5. An elevating truck comprising a wheel-supported main frame, load-supporting means, a front lifting beam pivotally mounted on said main frame and pivotally connected to said load-supporting means, a rear lifting beam pivotally mounted on said frame having means engaging said load-supporting means movable longitudinally thereof and relatively thereto, means for actuating said front lifting beam to raise the front end of said load-supporting means substantially vertically and a plurality of links symmetrically arranged with respect to the longitudinal axis of said load-supporting means connecting said front lifting beam to said rear lifting beam operable upon actuation of said front lifting beam to swing said rear lifting beam toward vertical position, thereby simultaneously lifting the rear end of said load-supporting means substantially vertically.

6. An elevating truck comprising load-supporting means, steering mechanism, a rear axle having a pair of wheels, a rear lifting beam pivotally mounted on said rear axle having means engaging said load-supporting means movable longitudinally thereof and relatively thereto, means for lifting the front end of said load-supporting means substantially vertically, and means operable thereby to swing said rear lifting means about the axis of said rear axle and thereby to raise the rear end of said load-supporting means substantially vertically.

7. An elevating truck comprising load-supporting means, steering mechanism including a tongue mounted to swing vertically, a rear axle, a rear lifting beam pivotally mounted on said axle having means engaging said load-supporting means movable longitudinally thereof and relatively thereto, a lifting lever pivotally mounted on said load-supporting means to swing vertically, means including a pawl pivotally mounted on said lifting lever and a co-operating ratchet mechanism operable by vertical swinging movements of said lifting lever to raise the front end of said load-supporting means substantially vertically step by step and simultaneously to swing said rear lifting beam toward vertical position, releasable means for locking said load-supporting means at each step of elevation, power-transmitting means intermediate of said tongue and said lifting lever operable upon vertical swinging movement of said tongue to actuate said lifting lever, and means for adjusting the effective length of said power-transmitting means.

8. An elevating truck comprising load-supporting means, steering mechanism including a tongue mounted to swing vertically, a lever pivotally mounted on said load-supporting means having a pawl pivoted thereon, a toothed sector pivotally mounted on said load-supporting means co-axially with said lifting lever in co-operative relation to said pawl, means operable by the movements of said sector when actuated by successive vertical swinging movements of said lifting lever to raise said load-supporting means, power-transmitting means intermediate of said tongue and said lifting lever, and means for adjusting the effective length of said power-transmitting means to establish and maintain proper relation between said pawl and the teeth of said sector.

9. An elevating truck comprising load-supporting means, steering mechanism including a tongue mounted to swing vertically, a lever pivotally mounted on said load-supporting means having a pawl pivoted thereon, a toothed sector pivotally mounted on said load-supporting means co-axially with said lifting lever in co-operative relation to said pawl, means operable by the movements of said sector when actuated by successive vertical swinging movements of said lifting lever to raise said load-supporting means, and a strut interposed between said tongue and said lifting lever having screw threaded connection with one of said members operable to permit adjustment of the effective length of said strut and thereby to establish and maintain proper relation between said pawl and the teeth of said sector.

10. An elevating truck comprising load-supporting means, steering mechanism including a tongue mounted to swing vertically, a lever pivotally mounted on said load-supporting means having a pawl pivoted thereon, a toothed sector pivotally mounted on said load-supporting means co-axially with said lifting lever in co-operative relation to said pawl, means operable by the movements of said sector when actuated by successive vertical swinging movements of said lifting lever to raise said load-supporting means, a strut interposed between said tongue and said lifting lever movable axially substantially in the direction of the axis of the steering post and comprising a lower section pivotally connected at its lower end to a steering tongue by a detachable pivot and an upper section connected to said lower section by a universal joint and having adjustable screw threaded connection with said lifting lever.

11. An elevating truck comprising load-supporting means, steering mechanism including a tongue pivotally mounted to swing vertically, lifting means operable by a vertical swinging movement of the tongue to raise said load-supporting means including releasable members to permit the descent of said load-supporting means, and a longitudinal extensible member operable to establish and maintain proper relation between the members of said releasable means.

In testimony whereof, I have signed my name to this specification.

NATHANIEL WARSHAW.